United States Patent [19]

Cavenar

[11] 4,016,072
[45] Apr. 5, 1977

[54] CONTROL APPARATUS FOR A LENGTH DETERMINING MACHINE

[75] Inventor: Clarence William Cavenar, Moore, Okla.

[73] Assignee: W & W Steel Company, Oklahoma City, Okla.

[22] Filed: Sept. 2, 1975

[21] Appl. No.: 609,386

Related U.S. Application Data

[63] Continuation-in-part of Ser. No. 489,107, July 17, 1974, Pat. No. 3,923,157.

[52] U.S. Cl. .............................. 209/74 R; 83/157; 83/158; 83/522
[51] Int. Cl.² ......................................... B07C 5/04
[58] Field of Search .............. 209/73, 74, 122, 123; 214/11 R; 83/203, 204, 205, 102, 104, 156, 157, 158, 159, 160, 522

[56] References Cited

UNITED STATES PATENTS

| | | |
|---|---|---|
| 2,793,662 | 5/1957 | Öholm ................................. 83/104 |
| 3,293,971 | 12/1966 | Kuss ................................. 83/522 X |
| 3,370,494 | 2/1968 | Schenck ........................... 83/157 X |
| 3,600,993 | 8/1971 | Williams et al. ................. 83/104 X |

Primary Examiner—Robert B. Reeves
Assistant Examiner—Joseph J. Rolla
Attorney, Agent, or Firm—Dunlap, Codding & McCarthy

[57] ABSTRACT

Control apparatus for a length determining machine having a length determining assembly and a removal assembly, the control apparatus comprising a length control portion controlling the operation of the length determining assembly of the length determining machine, a removal control portion controlling the operation of the removal assembly of the length determining machine, and an interlock portion to prevent the operation of the length control portion during the operation of the removal control portion.

12 Claims, 18 Drawing Figures

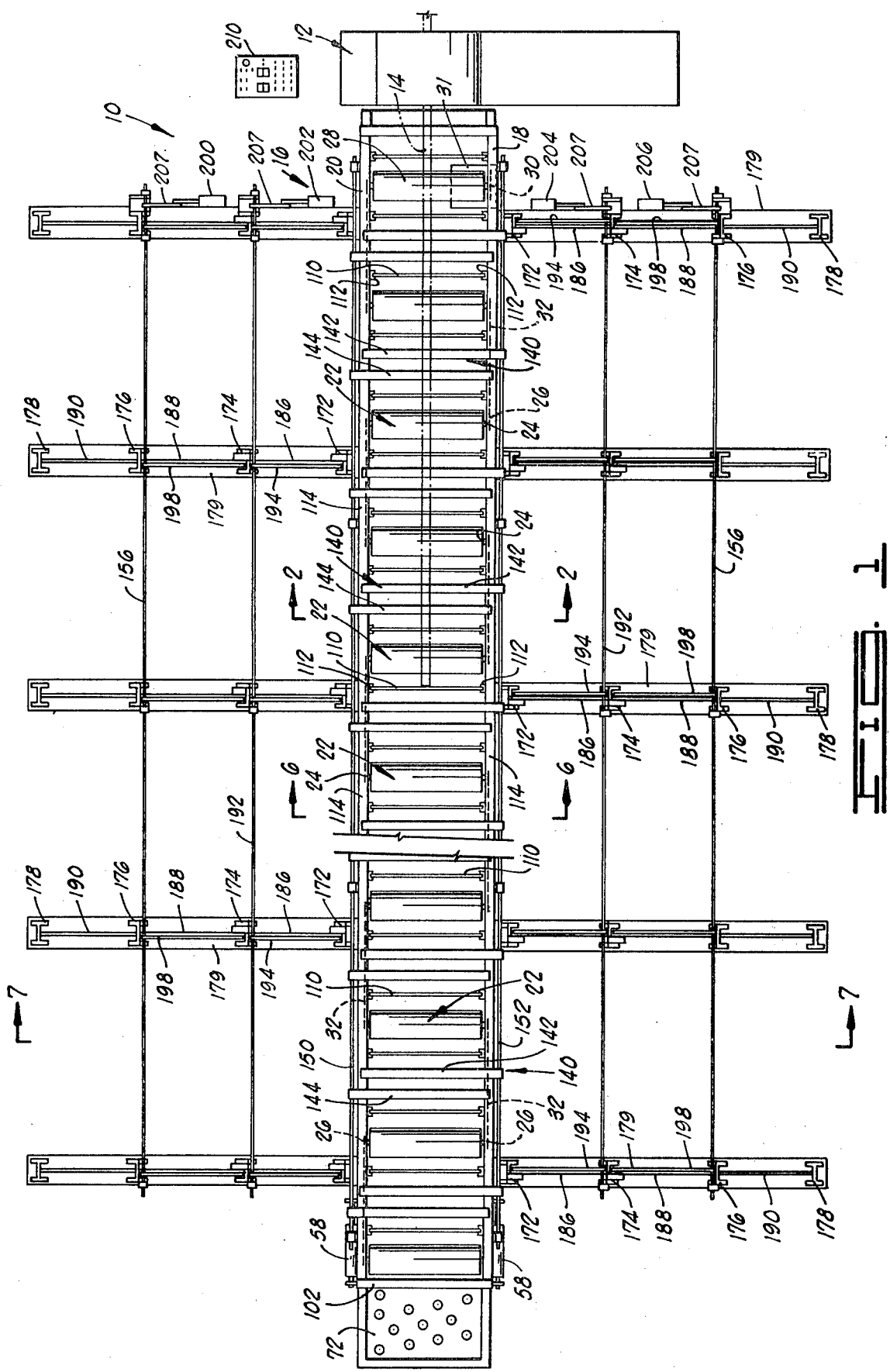

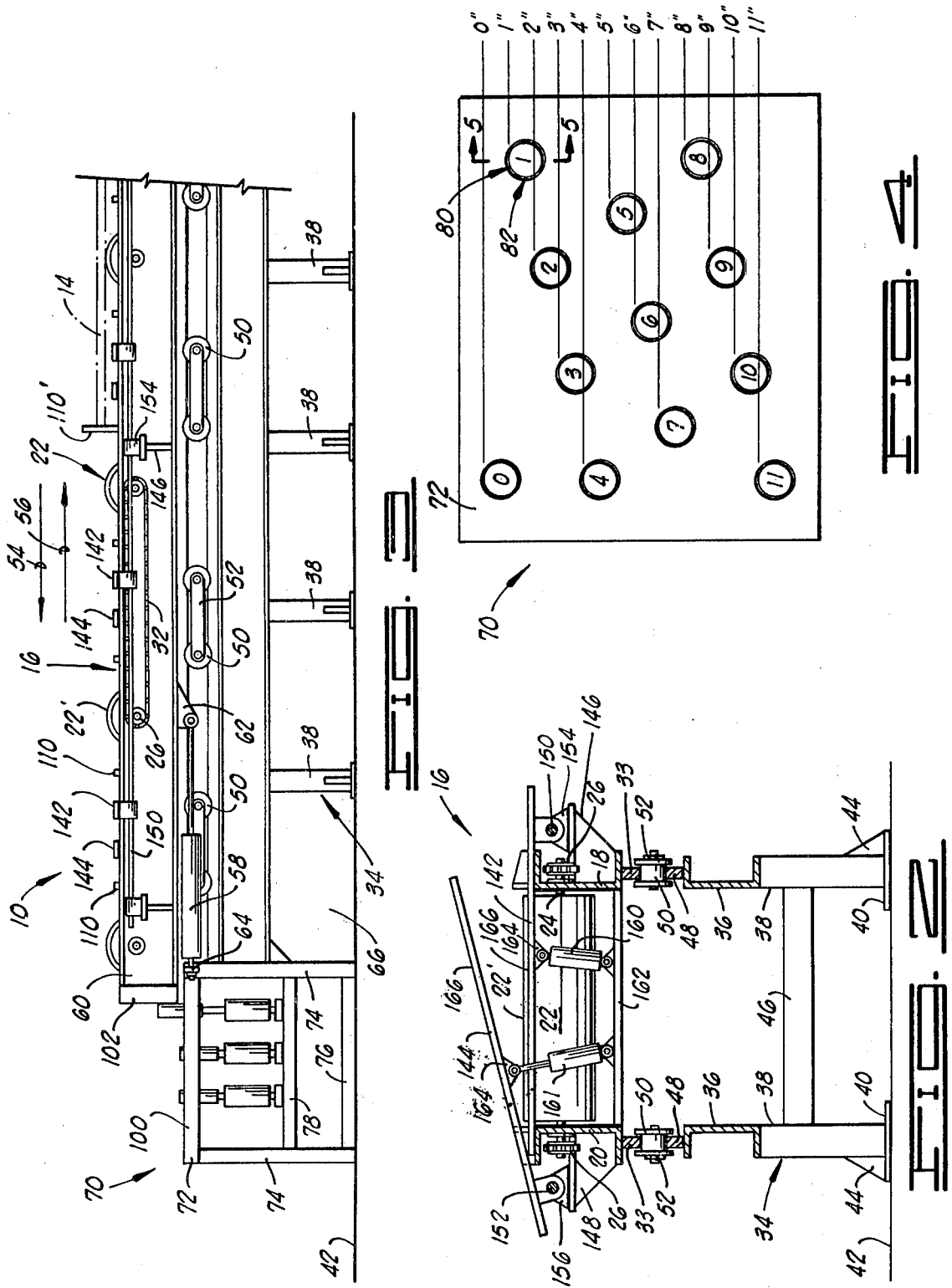

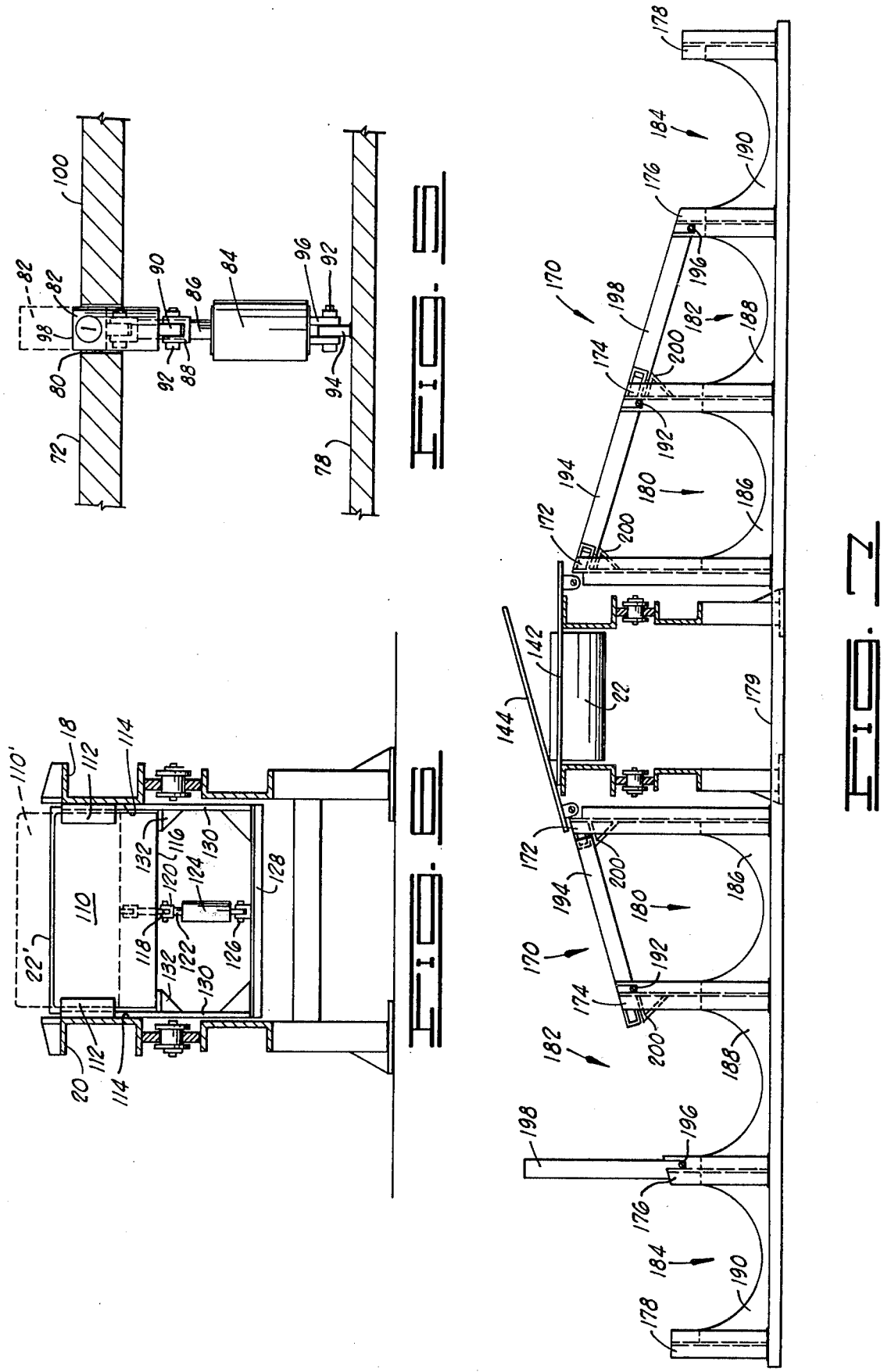

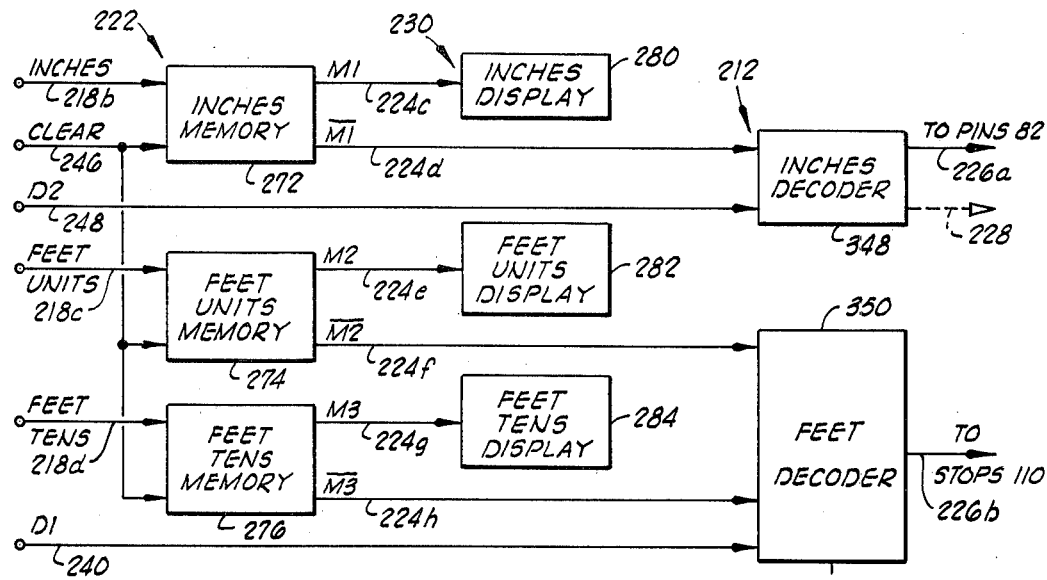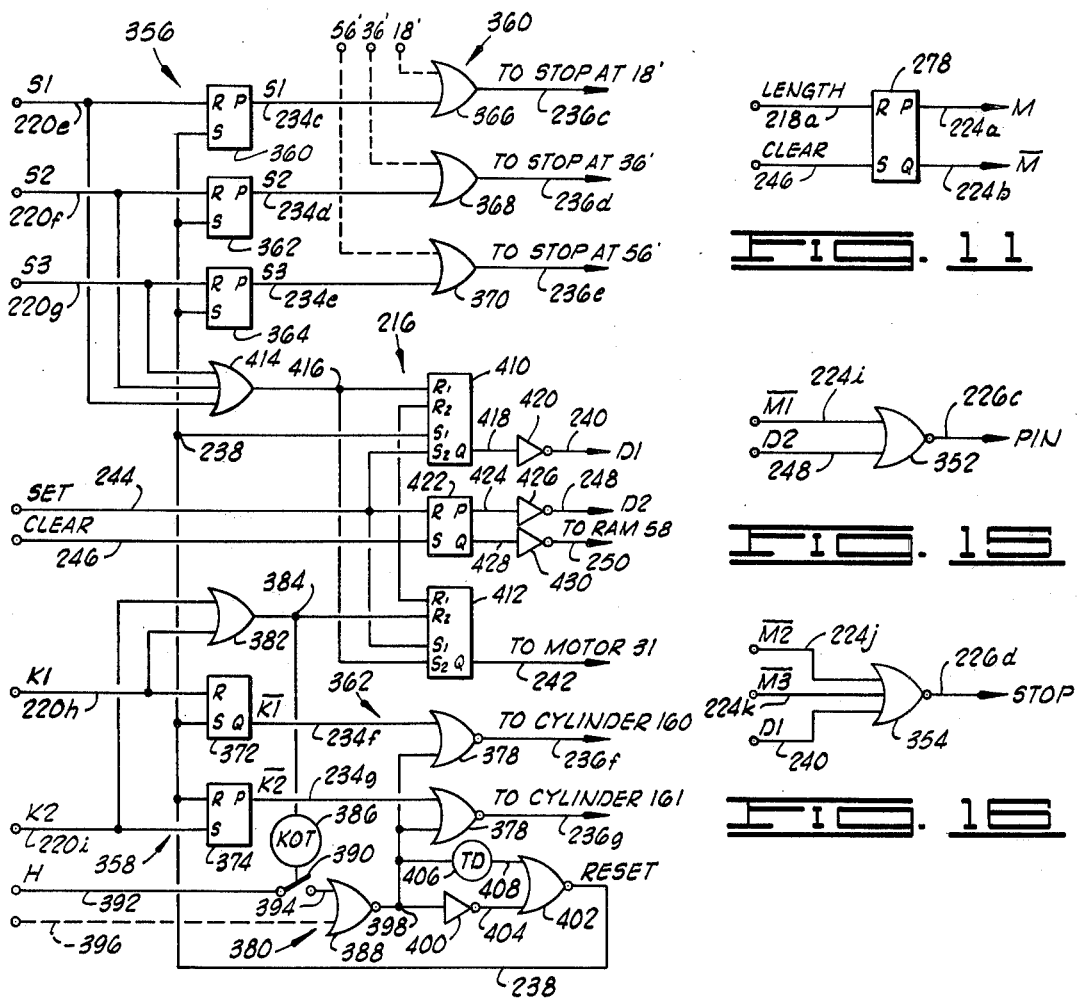

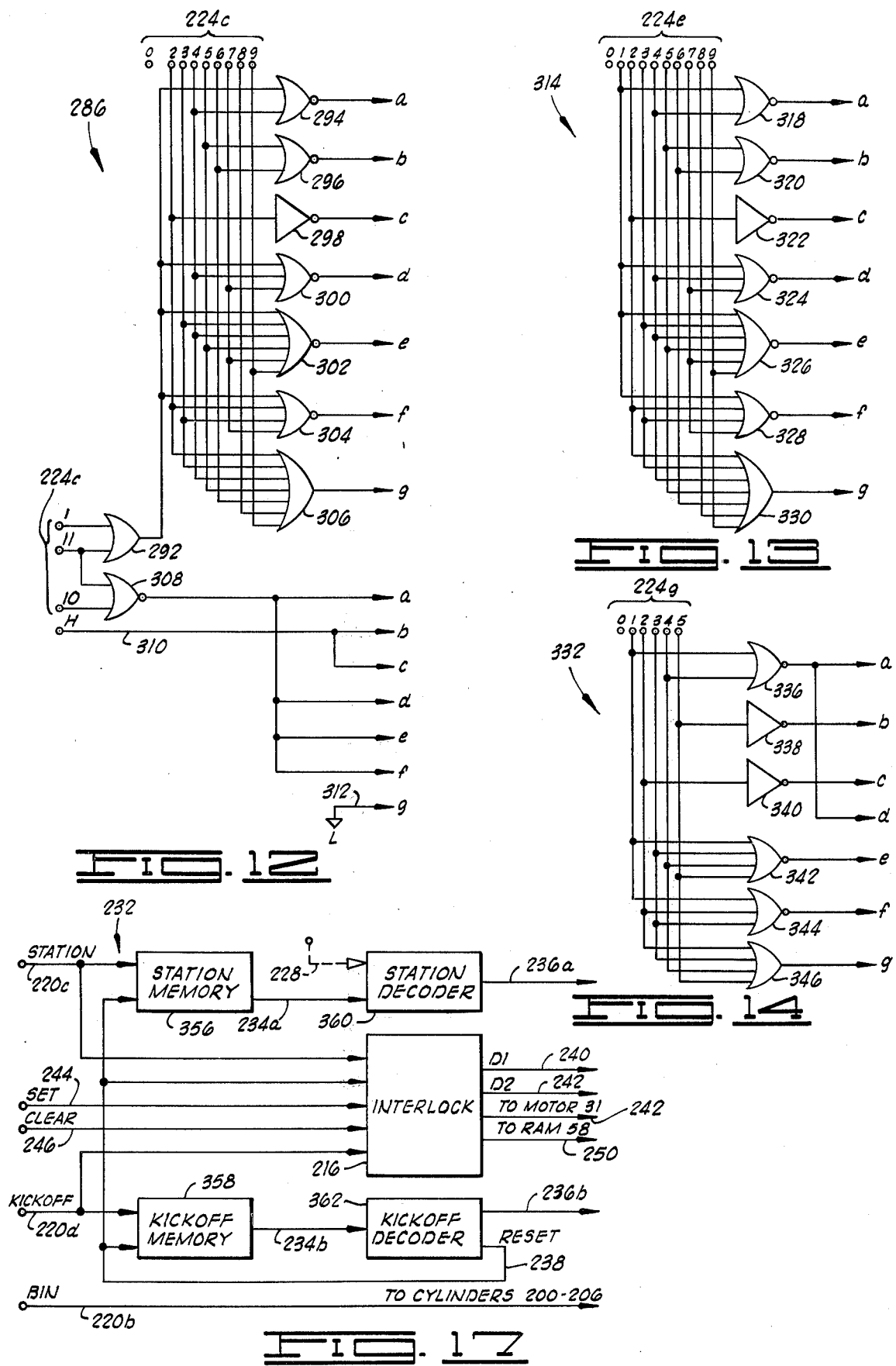

CONTROL APPARATUS FOR A LENGTH DETERMINING MACHINE

CROSS-REFERENCE TO RELATED APPLICATION

Continuation-in-part of application Ser. No. 489,107 entitled "Bar Handling and Length Determining Apparatus" filed July 17, 1974, now U.S. Pat. No. 3,923,157.

BACKGROUND OF THE INVENTION

1. Field of the Invention

The apparatus of the present invention relates generally to the field of material handling control systems and, more particularly, but not by way of limitation, to an apparatus for controlling the operation of a length determining machine.

2. Description of the Prior Art

In general, prior art length determining machines have been controlled substantially manually, with the simplest being controlled entirely manually, and the more complex being usually controlled via a combination of manual controls and simple servo-control devices. Due to the relatively simple nature of the control apparatus for these machines, the operation of the machines usually required constant monitoring and manual staging through each phase of operator. Since this monitoring and staging were most often performed by human operators, these systems presented numerous opportunities for errors of judgment, timing and manipulation, often resulting in damage and injury. In addition, the performance of such systems were highly dependent upon the speed with which the operator was able to cycle the machine through the individual phases of operation.

SUMMARY OF THE INVENTION

The present invention provides a control apparatus for controlling the operation of a length determining machine having a length determining assembly and a removal assembly, the control apparatus having a length control portion for receiving, retaining and displaying the operator's length inputs, and for controlling the operation of the length determining assembly of the length determining machine in response to the operator's inputs. The control apparatus also has a removal control portion of receiving and retaining the operator's removal inputs, and for controlling the operation of the removal assembly of the length determining machine in response to the operator's inputs. In addition, the control apparatus has an interlock portion for preventing the operation of the length control portion during the operation of the removal control portion to minimize the possibility of accidents.

It is a principal object of this invention to provide a control apparatus for controlling the operation of a length determining machine in a rapid and safe manner.

Another object of this invention is to provide a control apparatus for controlling the operation of a length determining mchine which is simple in design and operation.

One other object of this invention is to provide a control apparatus for controlling the operation of a length determining machine which is efficient in operation and requires minimum operator interaction.

Still another object of this invention is to provide a control apparatus for controlling the operation of a length determining machine which is economical and easily manufactured.

Other objects, features and advantages of the present invention will be apparent to those skilled in the art from the following detailed description of the presently preferred embodiments of the invention when read in conjunction with the accompanying drawings.

BRIEF DESCRIPTION OF THE DRAWINGS

FIG. 1 is a plan view of one length determining machine controllable by the present invention.

FIG. 2 is a cross-sectional view taken at 2—2 in FIG. 1.

FIG. 3 is a partial elevational view of the machine of FIG. 1.

FIG. 4 is a plan view of the conveyor strike assembly of the machine of FIG. 1.

FIG. 5 is a cross-sectional view taken at 5—5 in FIG. 4.

FIG. 6 is a cross-sectional view taken at 6—6 in FIG. 1.

FIG. 7 is a cross-sectional view taken at 7—7 in FIG. 1 except that the slide arms 198 are shown in the raised position.

FIG. 10 is a block representation of the length control portion of the control apparatus of FIG. 8.

FIG. 11 is a schematic of a typical R-S type flip-flop comprising the memory portions of the control apparatus of FIG. 10.

FIG. 12 is a schematic of the decoder-driver portion of the inches display portion of FIG. 10.

FIG. 13 is a schematic of the decoder-driver portion of the feet units display portion of FIG. 10.

FIG. 14 is a schematic of the decoder/driver portion of the feet tens display portion of FIG. 10.

FIG. 15 is a schematic of a typical NOR gate comprising the inches decoder portion of FIG. 10.

FIG. 16 is a schematic of a typical NOR gate comprising the feet decoder portion of FIG. 10.

FIG. 17 is a block representation of the removal and interlock portions of the control apparatus of FIG. 8.

FIG. 18 is a schematic of the removal and interlock portions of the control apparatus of FIGS. 8 and 17.

DESCRIPTION OF THE PREFERRED EMBODIMENT

Figure 8:
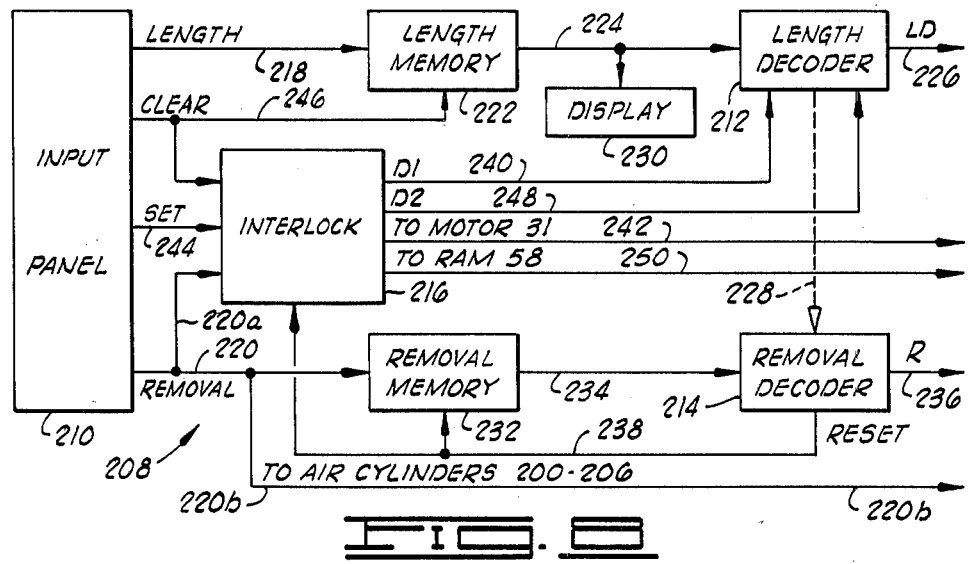
FIG. 8 is a block representation of the control apparatus of the present invention.

Referring to the figures generally and in particular to FIG. 1, a length determining machine, such as is described in co-pending application Ser. No. 489,107, now U.S. Pat. No. 3,923,157 is generally designated by the numeral 10. For clarity of explanation, the elements of the length determining machine 10 will be explained fully first, followed by a description of the control apparatus of the present invention.

Represented in block form is a bar shearing machine 12 which is conventional in the art, and comprises a set of blades capable of cutting a metal bar 14 that is shown extending through the machine prior to being cut. The bar 14 is usually of metal, but may be comprised of other materials for the purpose of the present invention.

The bar 14 is fed through the bar shearing machine 12 in any convenient way. It is the usual practice to provide a power conveyor to feed the bar 14 through the machine 12, but this may be done manually. As the bar 14 is pushed through the bar shearing machine 12 which is in an open blade mode, the bar is brought upon a power conveyor assembly 16. The power conveyor assembly 16 comprises a pair of parallel side members 18 and 20. A plurality of rollers 22 having axles 24 are bearingly mounted in appropriately aligned and mating apertures in the side members 18 and 20. The axle 24 extends through the apertures and has a chain sprocket 26 on each of its protruding ends. The first roller 28 over which the bar 14 travels is driven by means of a chain 30 connected to an electric drive motor 31, and all of the other rollers 22 are driven by the side chains 32 that connect the chain sprockets 26 in alternating pairs as shown in FIG. 1.

As best shown in FIG. 2, the side members 18 and 20 of the power conveyor assembly 16 have a support track edge 33 which is a rectangular metal strip welded to the bottom edge of the side members. The entire conveyor assembly 16 is supported on a frame 34 which is comprised of a pair of parallel U-beams 36 supported on a plurality of vertically disposed stanchions 38 that are welded to the base plates 40 that rest upon the floor 42. Web supports 44 brace the stanchions against sway and cross braces 46 firmly establish the distance therebetween. Welded along the top edge of the U-members 36 are the metal pieces 48 that are generally the shape of the support track edges 33 and which form a guide track for the power conveyor assembly 16. As best shown in FIG. 3, roller wheels 50 are independently disposed between the conveyor assembly 16 and the frame 34. The rollers 50 are connected in pairs by cross straps 52. The rollers 50 are grooved as shown in the cross section view of FIG. 2 and receive the support track edges 33 and the guide track 48 therein. This structure provides an independently suspended conveyor assembly 16 which is rollingly supported on the guide track 48 of the frame 34. That is, the power conveyor assembly 16 is movable in a first horizontal direction 54, which is coincident with the direction that the bar travels on the conveyor rollers 16, and the conveyor assembly is movable in a second horizontal direction 56 which is opposite to the direction 54.

A pair of pneumatic rams 58 are disposed at the distal end 60 of the conveyor assembly 16. The rams 58 move the conveyor assembly 16 in the first horizontal direction 54 when actuated and in the second horizontal direction 56 when deactuated. One end of each of the double-acting pneumatic rams 58 is connected to the conveyor assembly 16 at the extending member 62 connected thereto, and the other end of each pneumatic ram 58 is connected via the connector 64. The piping the pneumatic ram 58 and to all of the other pneumatic devices in the present invention has not been shown, but it is to be understood that such devices are connected to a controlled pressure fluid source by conventional structure.

Located at the distal end 66 of the frame 34 is a conveyor strike assembly 70 comprising a top plate 72 supported by frame members 74 that are cross braced by the base member 76 and by an intermediate shelf 78. As best shown in FIG. 4, the top plate 72 of the strike assembly 70 has twelve apertures 80, the spacing of which are established at one inch intervals as can be seen by the extension of the tangential lines to one side thereof and designated "0" inches through "11" inches. Disposed in each of the apertures 80 is a strike pin 82 (hereinafter referred to as pin 82) as can best be shown in the cross-sectional view in FIG. 5 taken at 5-5 in FIG. 4. The pin 82 is connected to an air cylinder 84 at its ram end 86 by means of clevis connector 88. The pin 82 has an apertured extending member 90 and a bolt and clotter key arrangement 92 securedly connects through the apertures of the clevis 88 and the aperture of member 90. In like manner, the intermediate shelf 78 has a plurality of extending apertured ears 94, and the clevis connector end 96 is connected thereto by means of a similar bolt and cotter key arrangement 92. Each aperture 80 is sized to clearingly receive the pin 82 in a sliding relationship thereto freely permitting the pin 82 to be positioned in a raised or striking engagement mode as shown in FIG. 5, or alternatively the pin 82 may be withdrawn so that its top surface 98 is substantially flush with the top surface 100 of the top plate 72.

The arrangement as described for the strike assembly 70 disposes twelve pins 82 (designated "0" through "11") at one inch intervals as shown in FIG. 4. As shown in FIG. 3, the distal end 60 of the power conveyor assembly 16 clears the surface 100 of the top plate 72 in its travel in directions 54 and 56, and is provided with a strike plate 102 for engaging whichever one of the pins 82 is raised above the surface 100. For convenience of reference, the strike assembly 70, together with the rams 58 and the associated apparatus will hereinafter be considered as comprising the inches portion of the length determining assembly of the length determining machine 10, since the strike assembly 70 cooperates with the rams 58 to define the movement of the conveyor assembly 16 in intervals of one inch.

Located along the conveyor assembly 16 at one foot intervals are fifty-seven stop members 110 (hereinafter referred to as stops 110) that are shown in the cross sectional view of FIG. 6 taken at 6—6 in FIG. 1. Each of the stops 110 is a rectangularly shaped panel disposed appropriately between the rollers 22 in guiding members 112 located on the inside surfaces 114 of side members 18 and 20. Extending from the lower edge 116 of each of the stops 110 is an apertured portion 118 that is connected to the clevis connector 120 on the ram end 122 of an air cylinder 124. The other end of the air cylinder 124 is connected via clevis connector 126 to a cylinder support member 128 that is positioned beneath the U-members 18 and 20 by means of straps 130 connected to the inside surfaces 114 of members 18 and 20. Brackets 132 project from the straps 130 for the lower edge 116 of the stop 110 to rest upon when the air cylinder 124 is retracted as shown in FIG. 6. When the air cylinder 124 is actuated so as to extend the ram end 122 as shown in dashed outline in FIG. 6, the stop 110 is projected above the adjacent roller 22', as shown at 110', so as to stop the travel of the bar 14 as it is moved in the first horizontal direction 54 by the action of the driven conveyor rollers 22. For convenience of reference, the stops 110, together with the rollers 22, the motor 31 and the associated apparatus will hereinafter be considered as comprising the feet portion of the length determining assembly of the length determining machine 10, since the stops 110 cooperate with the rollers 22 and the motor 31 to define the length of the bar 14 in intervals of one foot. Thus, the inches portion and the feet portion can conveniently be considered as comprising the length determining assembly of the length determining machine 10.

Kickoff means 140 are provided to lift a cut bar 14 from the rollers 22 and to slide it to either side of the conveyor assembly 16. The kickoff means 140 are comprised of a plurality of lift bars 142 and 144 that are inter-disposed between the rollers 22 and the stops 110 along the conveyor assembly 16. As shown in FIG. 2, the lift bars 142 and 144 are pivotally connected to opposite sides of the conveyor assembly 16. The protruding braces 146 and 148 extend from the U-members 18 and 20, respectively. All of the lift arms 142 are connected to a pivot rod 150, and all of the lift arms 144 are connected to a pivot rod 152. The pivot rod 150 is bearingly mounted to the braces 146 by appropriate bearing apertures in tabs 154 extending from the braces 146. In like manner the pivot rod 152 is bearingly mounted to the tabs 156 extending from the braces 148.

Air cylinders 160 and 161 are provided at intervals along the conveyor assembly 16 and are connected to a cross strap 162 extending from the bottom of U-member 18 to the comparable location on U-member 20, the other ends of the cylinders 160 being connected to protrusion tabs 164 on the undersides of some of the lift arms 142. That is, several of the lift arms 142 are provided with the air cylinders 160 that can be actuated in unison so as to pivot the associated lift arms 142 thereby rotating the pivot rod 150 to raise all of the lift arms 142 as shown in FIG. 2. In like manner, appropriately spaced air cylinders 161 are connected to lift arms 144 to raise all of the lift arms 144 in unison via the pivot rod 152. When the lift arms 142 and 144 are in the rest position, as depicted by the lift arm 142 in FIG. 2, the under surfaces of the lift arms rest on the top surface of the U-members 18 and 20, and the top surfaces 166 are disposed below the rolling surface 22' upon which the bar 14 is transported over conveyor assembly 16. For convenience of reference, the lift arms 142 and 144, together with the air cylinders 160 and 161 and the associated apparatus, will hereinafter be considered as comprising the kickoff portion of the removal assembly of the length determining machine since the lift arms 142 and 144, when raised by the air cylinders 160 and 161, effectively "kick" the bar 14 "off" the conveyor assembly 16.

Located alongside conveyor assembly 16 on each side thereof is a bin assembly 170. As can be seen in FIG. 7, each bin assembly 170 comprises four rows of stanchions 172, 174, 176 and 178 extending upward from the base plates 179 which lie on the floor 42 normal to the length of the conveyor 16. These stanchions 172–178 cooperate to form a bin 180, a bin 182, and a bin 184 into which the bars 14 can be placed as they are removed from the conveyor assembly 16. An arcuate member 186 is provided at the bottom of the bin 180 and is connected to the stanchions 172 and 174. In like manner, the arcuate members 188 and 190 are provided respectively between the stanchions 174 and 176 and the stanchions 176 and 178. The arcuate members 186, 188 and 190 serve to keep the cut bars 14 off of floor 42 and provide clearance under the bars 14 for the purpose of easily placing a chain or the like 14 about the bars 14 for lifting the bars 14 out of the bins by an overhead crane or the like.

Extending generally the length of the conveyor assembly 16 is a pivot rod 192 that is pivotally supported in slots in the upper end of each of the stanchions 174. Secured to the pivot rod 192 at each of the stanchions 174 is a slide arm 194 which can be raised so as to "open" the bin 180, or lowered so as to rest upon the stanchion 172 and "close" the bin 180. In like manner, a pivot rod 196 extends generally the length of the conveyor assembly 16 and is pivotally supported in slots in the upper ends of the stanchions 176. Located at each of the stanchions 176 is a slide arm 198 which can be raised or lowered via the pivot rod 196 to open or close the bin 182. Extension stops 200 are provided on the stanchions 172 and 174 to provide rest stops for the slide arms 194 and 198 when the slide arms are lowered. It should be noted that the height of the stanchions 172–178 are proportioned so that the slide arms 194 and 198 provide a slide track extending from the top of stanchion 172 to the stanchion 176 and consequently to the bin 184 when the slide arms 194 and 198 are lowered. Air cylinders 200, 202, 204 and 206, connected to the pivot rods 156 and 192 via the lever arms 207, can be actuated so as to raise each set of the slide arms 194 and 198. For convenience of reference, the slide arms 194 and 198, together with the air cylinders 200–206 and the associated apparatus, will hereinafter be considered as comprising the bin portion of the removal assembly of the length determining machine 10, since the slide arms 194 and 198, when raised by the air cylinders 200–206, effectively determine the bin 180–184 into which the bar 14 will be deposited upon removal from the conveyor assembly 16.

In the preferred embodiment, the bins 180–184 are sufficiently long so that it is desirable to divide each bin 180–184 into a plurality of work areas or "stations". In operation, this will allow the operator to remove newly cut bars 14 from the conveyor assembly 16 into one "station" of one of the bins 180–184 while previously cut bars 14 are being bundled and removed from another "station" of the same bin 180–184. To this end, several of the stops 110, such as the eighteen foot, the thirty-six foot, and the fifty-six foot stops 110, are operable not only during the length determining phase of operation but also during the removal phase of operation. Thus, for example, a cut bar 14 may be moved along the conveyor assembly 16 via the rollers 22, after the length determining stop 110 is lowered, into abuttment with a succeeding "station" stop 110, and thence "kicked off" into an adjacent station area of one of the bins 180–184. For convenience of reference, the set of stops 110, together with the assocated air cylinders 124 and associated apparatus, which are operable as "station" stops, will hereinafter be considered as comprising the station portion of the removal assembly of the length determining machine 10, since the "station" stops 110 effectively delimit each of the adjacent bins 180–184 into a set of removal "stations". Thus, the kickoff portion, the bin portion and the station portion can conveniently be considered as comprising the removal assembly of the length determining apparatus 10.

Referring now to FIG. 8, shown therein is a block representation of the control apparatus 208 for controlling the operation of a length determining machine such as the length determining machine 10 shown generally in FIGS. 1–7 and described above. Although the control apparatus 208 will hereinafter be described in relation to the length determining machine 10 for purposes of explanation, it is to be understood that the control apparatus 208 can be used to control other length determining machines which operate in substantially the same manner as the lengh determining machine 10. Further, the control apparatus 208 can be constructed from various types of components, including electrical, fluidic or electro-mechanical, without departing from the scope of the invention.

The control apparatus 208 consists primarily of an input panel 210, a length decoder 212, a removal decoder 214, and an interlock 216. The input panel 210, when positioned at a convenient location such as is shown in FIG. 1, can be operated upon by the operator of the control apparatus 208 to produce a "LENGTH" signal, via the general signal path 218, indicative of the length of the bar 14 to be cut, and a "REMOVAL" signal, via the general signal path 220, indicative of the operator's desire to remove the cut bar 14 from the conveyor assembly 16.

The LENGTH may then be applied directly to the length decoder 212 via the general signal path 218 or, preferably, the LENGTH signal may be applied to a length memory 222 interposed between the input panel 210 and the length decoder 212. If used, the length memory 222 operates to receive the LENGTH signal and thereafter continuously reproduce the LENGTH signal via the general signal path 224 for application to the length decoder 212.

The length decoder 212 receives the LENGTH signal, preferably from the length memory 222 via the general signal path 224, and actuates the length determining assembly of the length determining machine 10 in response to the received LENGTH signal. More particularly, the length decoder 212 produces a length determining signal "LD" via the general signal path 226 which actuates, in an appropriate manner, the length determining assembly described above in the description of the length determining machine 10. However, in the preferred embodiment, the actuation of those stops 110 which are operable as both length determining stops and as station stops, is shared with the removal decoder 214 as indicated by the dotted signal path 228 in FIG. 8.

In the preferred embodiment, a visual display 230 receives the LENGTH signal via the general signal path 224 and produces a visual display indicative of the received LENGTH signal. The visual display 230 is comprised of an appropriate number of numeric indicators, such as conventional 7-Segment Displays, and suitable decoder/driver portions as will be explained further below.

The REMOVAL signal may be applied directly to the removal decoder 214 via the general signal path 220, or, preferably, the REMOVAL signal may be applied to a removal memory 232 interposed between the input panel 210 and the removal decoder 214. If used, the removal memory 232 operates to receive the REMOVAL signal and thereafter continuously reproduce the REMOVAL signal via the general signal path 234 for application to the removal decoder 214.

The removal decoder 214 receives the REMOVAL signal, preferably from the removal memory 232 via the general signal path 234, and actuates the removal assembly of the length determining machine 10 in response to the received REMOVAL signal. More particularly, the removal decoder 214 produces a removal signal "R" via the general signal path 236 which actuates, in an appropriate manner, the removal assembly described above in the description of the length determining machine 10.

In the preferred embodiment, the removal decoder 214 also receives the station stop actuation signals from the length decoder 212 via the dotted signal path 228.

The removal decoder 214 effectively shares the station stops 110 with the length decoder 212 by allowing the length decoder 212 to actuate the station stops 110 during the length determining phase of operation, but preempting the station stops 110 during the removal phase of operation.

In the preferred embodiment, the removal decoder 214 also produces a "RESET" signal via the signal path 238, a predetermined time period after receiving the REMOVAL signal. The RESET signal is applied to the removal memory 232, if present, via the signal path 238 and operates to reset or clear the removal memory 232 in a conventional manner. The RESET signal is also applied to the interlock 216 via the signal path 238.

The interlock 216 receives the REMOVAL signal via the signal path 220a and the RESET signal via the signal path 238. In response to the received REMOVAL signal, the interlock 216 produces a first disable signal "D1" which is applied to the length decode 212 via the signal path 240 and disables the operation of the length determining assembly of the length determining machine 10 by disabling the operation of the length decoder 212. The interlock 216 also disables the operation of the motor 31 via the signal path 242 during the operation of the kickoff portion of the removal asssembly of the length determining machine 10.

In response to the received RESET signal, the interlock 216 enables the operation of the length determining assembly of the length determining machine 10 by removing the first disable signal D1 from the signal path 240 thus enabling the operation of the length decoder 212. The interlock 216 also enables the operation of the motor 31 via the signal path 242.

The REMOVAL signal is also applied via the general signal path 220b to the bin portion of the removal assembly of the length determining machine 10, so as to open or close the bins 180 or 182.

In the preferred embodiment, the input panel 210 also produces a "SET" signal via signal path 244 indicative of the operator's desire to initiate a cutting operation, and a "clear" signal via signal path 246 indicative of the operator's desire to clear all portions of the control apparatus 208 thereby returning all portions of the length determining machine 10 to the intitial starting or reset position.

In the preferred embodiment, therefore, the interlock 216 receives the SET signal via the signal path 244, and the CLEAR signal via the signal path 246. In response to the received SET signal, the interlock 216 enables the operation of the length decoder 212 by removing the first disable signal D1 from the signal path 240. The interlock 216 also enables the operation of the motor 31 via the signal path 242.

In response to the received CLEAR signal, the interlock 216 disables the operation of the length decoder 212 by applying the first disable signal D1 to the length decoder 212 via the signal path 240. The interlock 216 also disables the operation of the motor 31 via the signal path 242.

In addition to the above described operations, the interlock 216 in the preferred embodiment also produces a second disable signal "D2", in response to the received CLEAR signal, which is applied to the length decoder 212 via the signal path 248 to further disable the operation of the length decoder 212. The interlock 216 also deactuates the rams 58 so as to move the conveyor assembly 16 in the second direction 56 to the rest position, that is, to the maximum extent in the second direction 56.

Further, in response to the received SET signal, the interlock 216 removes the second disable signal D2 from the signal path 248 thus further enabling the operation of the length decoder 212. The interlock 216 also actuates the rams 58 via the signal path 250, so as to move the conveyor assembly 16 in the first direction 54 to the strike position, that is, into engagement with the raised one of the pins 82.

The CLEAR signal is also applied to the length memory 222 via the signal path 246 and operates to clear the length memory 222 in a conventional manner.

Figure 9:
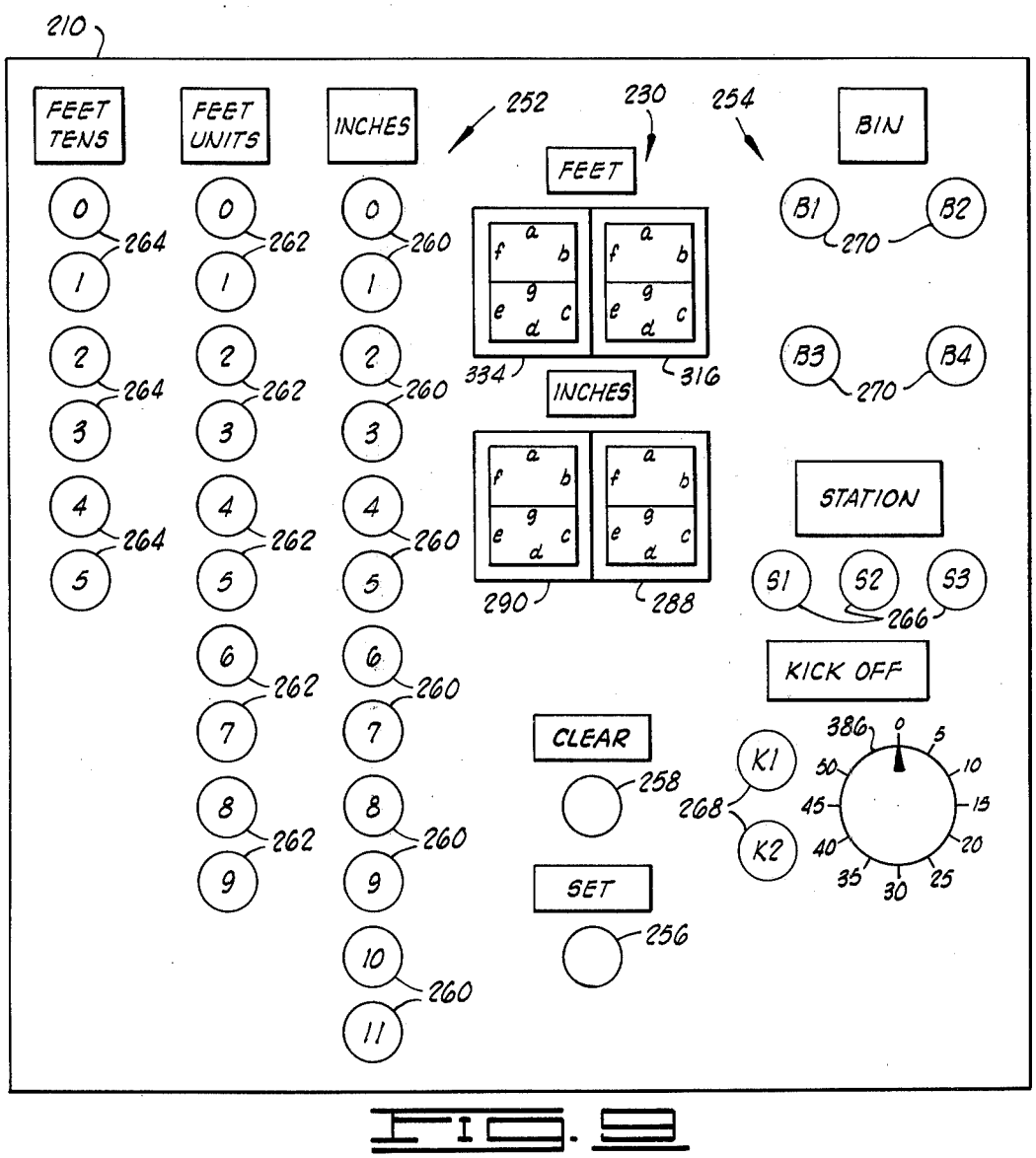
FIG. 9 is a typical layout of the input panel of the control apparatus.

The input panel 210, a typical layout of which is shown in FIG. 9, is primarily comprised of a set of length switches 252, a set of removal switches 254, a set switch 256 and a clear switch 258. In the preferred embodiment, the visual display 230 is mounted in relatively close proximity to the length switches 252 such as is shown in FIG. 9.

The length switches 252 include twelve inches switches 260 (designated "0" through "11"), ten feet units switches 262 (designated "0" through "9") and six feet tens switches 264 (designated "0" through "5"). Each of the switches 260, 262 and 264 is of the momentary type of conventional design.

When connected in accordance with the control apparatus 208 shown in FIG. 8, the length switches 252 may be actuated by the operator so as to produce a LENGTH signal varying from 0 feet 0 inches to 59 feet 11 inches, in intervals of 1 inch. For convenience of reference, the LENGTH signal will hereinafter be considered as being comprised of an INCHES portion produced by the inches switches 260, a FEET UNITS portion produced by the feet units switches 262, and a FEET TENS portion produced by the feet tens switches 264.

The removal switches 254 include three station switches 266 (designated S1, S2 and S3), two kickoff switches 268 (designated K1 and K2) and four bin switches 270 (designated B1, B2, B3 and B4.) The station switches 266 and the kickoff switches 268 are of the momentary type of conventional design. The bin switches 270 are of the persistent type, for example toggle, of conventional design.

When connected in accordance with the control apparatus 208 shown in FIG. 8, the removal switches 254 may be actuated by the operator so as to produce the REMOVAL signal described generally above. For convenience of reference, the REMOVAL signal will hereinafter be considered as being comprised of a STATION portion produced by the station switches 266, a KICKOFF portion produced by the kickoff switches 268, and a BIN portion produced by the bin switches 270.

The set switch 256 and the clear switch 258 are both of the momentary type of conventional design. When connected in accordance with the control apparatus 208 shown in FIG. 8, the set switch 256 and the clear switch 258 may be actuated by the operator so as to produce the SET and CLEAR signals, respectively, described generally above.

As shown in FIG. 10, the length memory 222 of the preferred embodiment is comprised of an inches memory portion 272, a feet units memory portion 274 and a feet tens memory portion 276. The memory portions 272, 274 and 276 are comprised of R-S type flip-flops of conventional design, such as the flip-flop 278 shown in FIG. 11, with the inches memory portion 272 having twelve flip-flops 278, the feet units memory portion 274 having ten flip-flops 278 and the feet tens memory portion 276 having six flip-flops 278. Using conventional notation, the flip-flops 278 will be place in a set state by a LENGTH signal applied via signal path 218a so as to produce a signal "M" via signal path 224a having the same logic state as the received LENGTH signal, and a signal "$\overline{M}$" via the signal path 224b having the inverse or opposite logic state as the received LENGTH signal. In logical terminology, the signal M will be "high" and the signal $\overline{M}$ will be "low" in response to a received LENGTH signal. The flip-flop 278 will continue to produce the signals M and $\overline{M}$ until a CLEAR signal is received via the signal path 246. In response to the received CLEAR signal, the flip-flop 278 will be placed in a cleared state so as to produce a "low" signal M via signal path 224a and a "high" signal M via signal path 224b, thus "clearing" the effects of the received LENGTH signal.

Referring again to FIG. 10, the inches memory portion 272 receives the INCHES portion of the LENGTH signal via the general signal path 218b and continuously reproduces the INCHES portion by producing, in the above described manner, the signals "M1" and "$\overline{M1}$" via the general signal paths 214c and 214d, respectively. The feet units memory portion 274 receives the FEET UNITS portion of the LENGTH signal via the general signal path 218c and continuously reproduces the FEET UNITS portion by appropriate producing the signals "M2" and "$\overline{M2}$" via the general signal paths 224e and 224f, respectively. The feet tens memory portion 276 receives the FEET TENS portion of the LENGTH signal via the general signal path 218d and continuously reprpoduces the FEET TENS portion by appropriately producing the signals "M3" and "$\overline{M3}$" via the general signal paths 224g and 224h, respectively.

Each of the memory portions 272, 274 and 276 receives the CLEAR signal via the signal path 246. In response to the received CLEAR signal, the inches memory portion 272 will be cleared, as described above. In a similar manner, the feet units memory portion 274 and the feet tens memory portion 276 will be cleared in response to the received CLEAR signal.

In the preferred embodiment, the visual display 230 is comprised of an inches display portion 280, a feet units display portion 282 and a feet tens display portion 284. The inches display portion 280 receives the INCHES portion of the LENGTH signal, that is the signal M1, via the general signal path 224c and produces a visual display indicative of the received INCHES portion of the LENGTH signal. The feet units display portion 282 receives the FEET UNITS portion of the LENGTH signal, that is the signal M2, via the general signal path 224c and produces a visual display indicative of the received FEET UNITS portion of the LENGTH signal. The feet tens display portion 284 receives the FEET TENS portion of the LENGTH signal, that is the signal M3, via the general signal path 224g and produces a visual display indicative of the received FEET TENS portion of the LENGTH signal.

As shown in FIG. 12, the inches display portion 280 has a decoder/driver portion 286 which receives the INCHES portion of the LENGTH signal, that is the signal M1, from the inches memory portion 272 via the general signal path 224c. More particularly, the decoder/driver portion 286 receives twelve signals (designated "0" through "11") M1, one signal M1 from each of the twelve flip-flops 278 comprising the inches memory portion 272 as described above. In response to the received INCHES portion of the LENGTH signal, the decoder/driver portion 286 appropriately activates the seven segments (designated a, b, c, d, e, f and g in a conventional manner) of a pair of conventional 7-segment displays 288 and 290 (shown in FIG. 9). The display 288 will hereinafter be referred to as the inch units display 288, and the display 290 will hereinafter be referred to as the inch tens display 290.

As will be clear to one skilled in the art, the decoder/driver portion 286 is a decimal-to-7-segment decoder/driver. The activation of the inch units display 288 via the decoder/driver portion 286 may best be described as follows: the segment a is deactivated via the OR gate 292 and the NOR gate 294 when one of the signals "1", "4" or "11" is received; the segment b is deactivated via the NOR gate 296 when one of the signals "5" or "6" is received; the segment c is deactivated via the NOT gate 298 when the signal "2" is received; the segment d is deactivated via the OR gate 292 and the NOR gate 300 when one of the signals "1", "4", "7" or "11" is received; the segment e is deactivated via the OR gate 292 and the NOR gate 302 when one of the signals "1", "3", "4", "5", "7", "9" or "11" is received; the segment f is deactivated via the OR gate 292 and the NOR gate 304 when one of the signals "1", "2", "3", "7" or "11" is received; and the segment g is activated via the OR gate 306 when one of the signals "2", "3", "4", "5", "6", "8" or "9" is received. For example, only the segments b, c, f and g of the inch units display 288 are activated when the signal "4" is received, thus visually displaying the numeral "4" on the inch units display 288.

The activation of the inch tens display 290 can best be described as follows: the segments a, d, e and f are deactivated via the NOR gate 308 when one of the signals "10" or "11" is received; the segments b and c are always activated, being connected to a "high" signal source H via the signal path 310; and the segment g is always deactivated, being connected to a "low" signal source L, via the signal path 312. Thus, the segments a, b, c, d, e and f of the inch tens display 290 will be activated to visually display the numeral "0" in the absence of the signals "10" and "11". However, only the segments b and c will be activated when one of the signals "10" or "11" is received, thus visually displaying the numeral "1" on the inch tens display 290.

As shown in FIG. 13, the feet units display portion 282 has a decimal-to-7-segment decoder/driver portion 314 which receives the FEET UNITS portion of the LENGTH signal, that is the signal M2, from the feet units memory portion 274 via the general signal path 224e. More particularly, the decoder/driver portion 314 receives ten signals (designated "0" through "9") M2, one signal M2 from each of the ten flip-flops 278 comprising the feet units memory portion 274 as described above. In response to the received FEET UNITS portion of the LENGTH signal, the decoder/driver portion 314 appropriately activates the seven segments (again conventionally designated a through g) of a 7-segment display 316 (shown in FIG. 9), hereinafter referred to as the feet units display 316.

The activation of the feet units display 316 via the decoder/driver portion 314 may best be described as follows: the segment a is deactivated via the NOR gate 318 when one of the signals "1" is received; the segment b is deactivated via the NOR gate 320 when one of the signals "5" or "6" is received; the segment c is deactivated via the NOT gate 322 when the signal "2" is received; the segment d is deactivated via the NOR gate 324 when one of the signals "1", "4" or "7" is received; the segment e is deactivated via the NOR gate 326 when one of the signals "1", "3", "4", "5", "7" or "g" is received; the segment f is deactivated via the NOR gate 328 when one of the signals "1", "2", "3" is received; and the segment g is activated via the OR gate 330 when one of the signals "2", "3", "4", "5", "6", "8" or "9" is received. Thus, for example, if no signal M2 is received (i.e. the feet units memory portion 274 has been cleared) then only the segments a, b, c, d, e and f are activated to visually display the numeral "0" on the feet units display 316.

As shown in FIG. 14, the feet tens display portion 284 has a decimal-to-7-segment decoder/driver portion 332 which receives the FEET TENS portion of the LENGTH signal, that is the signal M3, from the feet tens memory portion 276 via the general signal path 224g. More particularly, the decoder/driver portion 332 receives the six signals (designated "0" through "5") M3, one signal M3 from each of the six flip-flops 278 comprising the feet tens memory portion 276 as described above. In response to the received FEET TENS portion of the LENGTH signal, the decoder/driver portion 332 appropriately activates the seven segments (again conventionally designated a through g) of a 7-segment display 334 (shown in FIG. 9), hereinafter referred to as the feet tens display 334.

The activation of the feet tens display 334 via the decoder/driver portion 332 may best be described as follows: the segments a and d are deactivated via the NOR gate 336 when one of the signals "1" or "4" is received; the segment b is deactivated via the NOT gate 338 when the signal "5" is received; the segment c is deactivated via the NOT gate 340 when the signal "2" is received; the segment e is deactivated via the NOR gate 342 when one of the signals "1", "3", "4" or "5" is received; the segment f is deactivated via the NOR gate 334 when one of the signals "1", "2" or "3" is received; and the segment g is activated via the OR gate 346 when one of the signals "2", "3", "4" or "5" is received. Thus, for example, only the segments a, b, d, e and g are activated when the signal "2" is received; thus visually displaying the numeral "2" on the feet tens display 334.

Again referring to the preferred embodiment shown in FIG. 10, the length decoder 212 is comprised of an inches decoder portion 348 and a feet decoder portion 350. The inches decoder portion 348 receives the INCHES portion of the LENGTH signal, that is the signal M1, via the general signal path 224d and actuates the inches portion of the length determining assembly of the length determining machine 10 via the general signal path 226a in accordance with the received INCHES portion of the LENGTH signal. The feet decoder portion 350 receives the FEET UNITS portion and the FEET TENS portion of the LENGTH signal, that is the signals M2 and M3, via the general signal paths 224f and 224h, respectively, and actuates the feet portion of the length determining assembly of the length determining machine 10 via the general signal path 226b in accordance with the received FEET UNITS portion and the FEET TENS portion of the LENGTH signal.

In addition to receiving the INCHES portion of the LENGTH signal, the inches decoder portion 348 also receives the second disable signal D2 from the interlock 216 via the signal path 248. More particularly, the inches decoder portion 348 is comprised of twelve NOR gates 352, a typical one of which is shown in FIG. 15, each of which receives a different one of the signals $\overline{M1}$ via the signal path 224i from a corresponding one of the flip-flops 278 comprising the inches memory portion 272 as described above. Further, each one of the NOR gates 352 receives the second disable signal D2 via the signal path 248. As will be clear to one skilled in the art, a NOR gate 352 will actuate a corresponding one of the air cylinders 84 via the signal path 226c to raise a pin 82 only when the NOR gate 352 receives neither a "high" signal $\overline{M1}$ nor the second disable signal D2. Thus a given pin 82 will not be raised either when the corresponding flip-flop 278 is in the cleared state or when the interlock 216 is producing the second disable signal D2.

In addition to receiving the FEET UNITS portion and the FEET TENS portion of the LENGTH signal, the feet decoder portion 350 also receives the first disable signal D1 from the interlock 216 via the signal path 240. More particularly, the feet decoder portion 350 is comprised of fifty-seven NOR gates 354, a typical one of which is shown in FIG. 16, each of which receives one of the signals $\overline{M2}$ and one of the signals $\overline{M3}$ from corresponding ones of the flip-flops 278 comprising the feet units memory portion 274 and the feet tens memory portion 276, respectively, as described above. Thus for example, the thirty-fourth NOR gate 354 would receive a signal $\overline{M2}$ from the fourth flip-flop 278 of the feet units memory portion 274 via a corresponding signal path 224j; and a signal $\overline{M3}$ from the third flip-flop 278 of the feet tens memory portion 276 via a corresponding signal path 224k. Further, each one of the NOR gates 354 receives the first disable signal D1 via the signal path 240.

As will be clear to one skilled in the art, a NOR gate 354 will actuate a corresponding one of the air cylinders 124 via a signal path 226d to raise a stop 110 only when the NOR gate 354 receives neither a "high" signal $\overline{M2}$, a "high" signal $\overline{M3}$, nor the first disable signal D1. Thus a given gate 110 will not be raised unless the corresponding flip-flops 278 in the feet units memory portion 274 and the feet tens memory portion 276 are in the set state and the interlock 216 is not producing the first disable signal D1. In the preferred embodiment, the STOP signals produced by the nineteenth, the thirty-seventh and the fifty-seventh NOR gates 354 are applied via the dotted signal path 228 to the removal decoder 214.

Referring now to FIG. 17, the removal memory 232 of the preferred embodiment is comprised of a station memory portion 356 and a kickoff memory portion 358. Further, the removal decoder 214 is comprised of a station decoder portion 360 and a kickoff decoder portion 362. The station memory portion 356 receives the STATION portion of the REMOVAL signal via the general signal path 220c and continuously reproduces the STATION portion for application to the station decoder portion 360 via the general signal path 234a. The kickoff memory portion 358 receives the KICKOFF portion of the REMOVAL signal via the general signal path 220d and continuously reproduces the KICKOFF portion for application to the kickoff decoder portion 362 via general signal path 234b.

The station decoder portion 360 receives the STATION portion of the REMOVAL signal via the general signal path 234a and actuates the station portion of the removal assembly of the length determining machine 10 via the general signal path 236a by actuating one of the air cylinders 124 in accordance with the received STATION portion. In the preferred embodiment, the station decoder portion 360 also receives the STOP signals produced by the length decoder 212 via the dotted signal path 228 and actuates one of the air cylinders 124 in accordance with the received STOP signals. The kickoff portion 362 receives the KICKOFF portion of the REMOVAL signal via the general signal path 234b and actuates the kickoff portion of the removal assembly of the length determining machine 10 via the general signal path 236b by actuating the air cylinders 160 or 161 in accordance with the received KICKOFF portion. The kickoff decoder portion 362 also produces the RESET signal via the signal path 238, a predetermined time period after receiving the KICKOFF portion of the REMOVAL signal.

Both the station memory portion 356 and the kickoff memory portion 358 receive the RESET signal via the signal path 238 and are cleared in response to the received RESET signal. The interlock 216 also receives the RESET signal via the signal path 238, and, as described generally above, enables the operation of the length decoder 212 by removing the first disable signal D1 from the signal path 240 in response to the received RESET signal.

As shown in FIG. 17, the BIN portion of the REMOVAL signal is applied substantially directly to the air cylinders 200–206 via the general signal path 220b so as to open or close the bins 180 and 184 in accordance with the BIN portion.

As shown in FIG. 18, the station memory portion 356 is comprised of three R-S type flip-flops 360, 362 and 364 of conventional design. The flip-flop 360 receives a signal S1 from the station switch 266 designated S1, via the signal path 220e; the flip-flop 362 receives a signal S2 from the station switch 266 designated S2, via the signal path 220f; and the flip-flop 364 receives a signal S3 from the station switch 266 designated S3, via the signal path 220g, the signals S1, S2 and S3 comprising the STATION portion of the REMOVAL signal. Each of the flip-flops 360, 362 and 364 also receives the RESET signal via the signal path 238. Each of the flip-flops 360, 362 and 364 continuously reproduces the received signal S1, S2 or S3, via the signal path 234c, 234d or 234e, respectively, until cleared in response to a received RESET signal in a manner described generally above.

The station decoder portion 360 is comprised of three OR gates 366, 368 and 370. The OR gate 366 receives the signal S1 from the flip-flop 360 via the signal path 234c and, in the preferred embodiment, also the STOP signal produced by the nineteenth NOR gate 354 of the feet decoder portion 350. In response to either a received signal S1 or a STOP signal, the OR gate 366 actuates the nineteenth air cylinder 124 via the signal path 236c to raise the eighteen foot stop 110. The OR gate 368 receives the signal S2 from the flip-flop 362 via the signal path 234d and, in the preferred embodiment, also the STOP signal produced by the thirty-seventh NOR gate 354, and, in response to either a received signal S2 or a received STOP signal, actuates the thirty-seventh air cylinder 124 via the signal path 236d to raise the thirty-six foot stop 110. The OR gate 370 receives the signal S3 from the flip-flop 364 via the signal path 234e and, in the preferred embodiment, also the STOP signal produced by the fifty-seventh NOR gate 354, and, in response to either a received signal S3 or a received STOP signal, actuates the fifty-seventh air cylinder 124 via the signal path 236e to raise the fifty-six foot stop 110.

The kickoff memory portion 358 is comprised of two R-S type flip-flops 372 and 374 of conventional design. The flip-flop 372 receives a signal K1 from the kickoff switch 268 designated K1, via the signal path 220h, and the flip-flop 374 receives a signal K2 from the kickoff switch 268 designated K2, via the signal path 220i. Each of the flip-flops 372 and 374 also receives the RESET signal via the signal path 238. Each of the flip-flops 372 and 374 continuously reproduces the logical inverse of the received signal K1 or K2, that is the signal $\overline{K1}$ or $\overline{K2}$, via the signal path 234f or 234g, respectively, until cleared in response to a received RESET signal in a manner described generally above.

The kickoff decoder portion 362 is comprised primarily of two NOR gates 376 and 378. In the preferred embodiment, the kickoff decoder portion 362 also includes a timer portion 380 which receives the KICKOFF portion of the REMOVAL signal and produces the RESET signal a predetermined time period after receiving the KICKOFF portion. More particularly, the signals K1 and K2 are applied via the signal paths 220h and 220i, respectively, the OR gate 382, and the signal path 384 to a kickoff timer 386. The kickoff timer 386, shown in FIG. 9, is preferably a double pole - double throw, delay-on-application timer having a variable delay range on the order of 2.5 to 50 seconds. The kickoff timer 386 receives the KICKOFF portion of the REMOVAL signal via the signal path 384 and, in response to the receival thereof, applies a "high" signal to a NOR gate 388 by closing a switch 390 interposed in a signal path 392 between the NOR gate 388 and the "high" signal source H. The NOR gate 388 receives the "high" signal via the signal path 394 and, optionally, an operator reset signal via the dotted signal path 396 from an optional momentary switch (not shown) which can be mounted on the input panel 210 in an appropriate location. In response to receiving a signal on either the signal path 394 or the dotted signal path 396, the NOR gate 388 will produce a "low" signal on the signal path 398.

The NOR gate 376 receives the signal $\overline{K1}$ via the signal path 234f and the signal produced by the NOR gate 388 via the signal path 398 and actuates the air cylinders 160 via the signal path 236f so as to raise the lift arms 142 only when both received signals are in the "low" state. Thus, the NOR gate 376 will actuate the cylinders 160 only when the flip-flop 272 is producing a "low" signal $\overline{K1}$ in reponse to receiving the signal K1, and when the NOR gate 388 is producing a "low" signal in response to receiving the optional operator reset signal or a "high" signal via the signal path 394. The NOR gate 378 receives the signal $\overline{K2}$ via the signal path 234g and the signal produced by the NOR gate 388, and actuates the air cylinders 161 via the signal path 236g so as to raise the lift arms 144 only when both received signals are in the "low" state substantially as described above in relation to the operation of the NOR gate 376.

The kickoff timer 386 should be set by the operator so as to maintain the switch 390 in a closed position for a period of time sufficient to allow the NOR gates 376 or 378 to raise the lift arms 142 or 144, respectively, and maintain the lift arms 142 or 144 in the raised position until the bar 14 is effectively removed from the conveyor assembly 16 to one of the adjacent bins 180–184. At the end of this predetermined time period, the kickoff timer 386 will open the switch 390 causing the NOR gate 388 to produce a "high" signal via signal path 398. The "high" signal on the signal path 398 will, in turn, cause the NOR gates 376 and 378 to deactuate the air cylinders 160 and 161 in an appropriate manner.

The "high" signal produced by the NOR gate 388 via the signal path 398 is also inverted by the NOT gate 400 and applied to the NOR gate 402 via the signal path 404. The "high" signal produced by the NOR gate 388 is also passed through a time delay 406 before application to the NOR gate 402 via the signal path 408. The time delay 406, which can be simply a resistor coupled to a capacitor, delays the application of the "high" signal to the NOR gate 402 until the NOR gate 402 has had adequate time to produce a RESET signal, via the signal path 238, sufficient to clear the flip-flops 360, 362, 364, 372, and 374. Thus, it is clear that the initiation of the RESET signal is determined by the kickoff timer 386 or the optional operator reset switch, and the duration of the RESET signal is determined by the time delay 406.

Referring still to FIG. 18, the interlock 216 is comprised primarily of a stop control flip-flop 410 and a conveyor control flip-flop 412. Each of the flip-flops 410 and 412 is an R-S type flip-flop of conventional design.

The stop control flip-flop 410 receives the STATION portion of the REMOVAL signal via the signal paths 220e, 220f and 220g, the OR gate 414 and the signal path 416, and the RESET signal via the signal path 238. In response to the received STATION portion, the stop control flip-flop 410 disables the operation of the feet portion of the length determining assembly of the length determining machine 10. In response to the received RESET signal, the stop control flip-flop 410 enables the operation of the feet portion of the length determining assembly of the length determining machine 10. More particularly, the stop control flip-flop 410 produces the first disable signal D1 via the signal path 418, the NOT gate 420 and the signal path 240 to disable the operation of the feet decoder portion 350 of the length decoder 212, in response to the received STATION portion. Further, the stop control flip-flop 410 ceases to produce the first disable signal D1 thus enabling the operation of the feet decoder portion 350, in response to the received RESET signal.

The conveyor control flip-flop 412 receives the KICKOFF portion of the REMOVAL signal via the signal paths 220h and 220i, the OR gate 382 and the signal path 384, and the STATION portion of the REMOVAL signal via the signal paths 220c, 220f and 220g, the OR gate 414 and the signal path 416. In response to the received KICKOFF portion, the conveyor control flip-flop 412 deactuates the power conveyor assembly, that is primarily the motor 31, of the length determining machine 10 via the signal path 242. In response to the received STATION portion, the conveyor control flip-flop 412 actuates the power conveyor assembly, that is primarily the motor 31, of the length determining machine 10.

In the preferred embodiment, the interlock 216 includes a pin control flip-flop 422 which is an R-S type flip-flop of conventional design. The pin control flip-flop 422 receives the SET signal via the signal path 244 and the CLEAR signal via the signal path 246. In response to the received SET signal, the pin control flip-flop 422 actuates the inches portion of the length determining assembly of the length determining machine 10. In response to the received clear signal, the pin control flip-flop 422 deactuates the inches portion of the length determining assembly of the length determining machine 10. More particularly, the pin control flip-flop 422 produces the second disable signal D2 via the signal path 424, the NOT gate 426 and the signal path 248 to disable the operation of the inches decoder portion 348 of the length decoder 212, and deactuates the ram 58 via the signal path 428, the NOT gate 430 and the signal path 250, both in response to the received CLEAR signal. Further, the pin control flip-flop 422 ceases to produce the second disable signal D2 thus enabling the operation of the inches decoder portion 348, and actuates the ram 58, both in response to the received SET signal.

In the preferred embodiment, the stop control flip-flop 410 also receives the SET signal via the signal path 244 and the CLEAR signal via the signal path 246. In response to the received CLEAR signal, the stop control flip-flop 410 disables the operation of the feet portion of the length determining assembly of the length determining machine 10. In response to the received SET signal, the stop control flip-flop 410 enables the operation of the feet portion of the length determining means of the length determining machine 10. More particularly, the stop control flip-flop 410 produces the first disable signal D1, as described above, to disable the operation of the feet decoder portion 350 of the length decoder 212, in response to the received CLEAR signal. Further, the stop control flip-flop 410 ceases to produce the first disable signal D1 thus enabling the operaton of the feet decoder portion 350, in response to the received SET signal.

In the preferred embodiment, the conveyor control flip-flop 412 also receives the SET signal via the signal path 244 and the CLEAR signal via the signal path 246. In response to the received CLEAR signal, the conveyor control flip-flop 412 deactuates the motor 31 as described above. In response to the received SET signal, the conveyor control flip-flop 412 actuates the motor 31.

The NOT gates 420, 426 and 430 are provided in the preferred embodiment to assure that the signals D1 and D2 will be maintained in the "high" state and the power conveyor assembly 16 moved to the rest position via the ram 58 in the event that the set switch 256 and the clear switch 258 are depressed simultaneously. Of course, the flip-flops 410 and 422 are designed to output "high" signals on both the P and Q outputs when the R and S inputs are both "high", then the NOT gates 420, 426 and 430 may be eliminated.

The OR gate 414 is most conveniently considered as part of the interlock 216. In a similar manner, the OR gate 382 can conveniently be considered as a part of the interlock 216 also, or the OR gate 382 can be considered to be shared by both the interlock 216 and the kickoff decoder portion 362 of the removal decoder 214. It is clear, however, that separate OR gates can be provided for both the interlock 216 and the removal decoder 214 although the additional OR gate would be redundant in operation and thus unnecessary.

It is to be understood that some or all of the actuation signals produced by the control apparatus 208 for application to the various components of the length determining machine 10, such a the BIN portion of the REMOVAL signal as applied to the air cylinders 200–206 via the general signal path 220b (FIG. 17), can be amplified or converted by appropriate conventional relays in order to obtain operational control mediums and levels. Since such considerations are well known in the art, no further discussion pertaining to this aspect of the present invention will be included herein.

OPERATION OF THE PREFERRED EMBODIMENT

Initially, the clear switch 258 (see FIG. 9) on the input panel 210 (FIGS. 1 and 9) should be depressed to clear the control apparatus 208. The CLEAR signal so produced is applied, as shown in FIG. 8, to the length memory 222. More particularly, the CLEAR signal is applied to each of the flip-flops 278 (FIG. 11) comprising the inches memory portion 272, the feet units memory portion 274 and the feet tens memory portion 276 (FIG. 10) of the length memory 222 (FIG. 8) and operates to clear the flip-flops 278. The clearing of the flip-flops 278 assures that no LENGTH signal is applied to either the length decoder 212 or to the visual display 230 (FIG. 8). However, the decoder/driver portions 286 (FIG. 12), 314 (FIG. 13) and 332 (FIG. 14) of the inches display portion 280, the feet units display portion 282 and the feet tens display portion 284 (FIG. 10), respectively, of the visual display 230 (FIG. 8), are designed to produce a visual display of 0 feet and 0 inches, via the inch units display 288, the inch tens display 290, the feet units display 316 and the feet tens display 334 (FIG. 9), when no LENGTH signal is applied thereto.

Simultaneously, the CLEAR signal is applied to the interlock 216, as shown in both FIS. 8 and 17. More particularly, the CLEAR signal is applied to the stop control flip-flop 410, the conveyor control flip-flop 412 and the pin control flip-flop 422 (FIG. 18). In response to the CLEAR signal, the stop control flip-flop 410 produces the first disable signal D1 to disable the operation of each of the NOR gates 354 (FIG. 16) comprising the feet decoder portion 350 (FIG. 10) of the length decoder 212 (FIG. 8). In response to the CLEAR signal, the conveyor control flip-flop 412 deactuates the motor 31. In response to the CLEAR signal, the pin control flip-flop 422 produces the second bisable signal D2 to disable the operation of each of the NOR gates 352 (FIG. 15) comprising the inches decoder portion 348 (FIG. 10) of the length decoder 212 (FIG. 8). The pin control flip-flop 422 also deactuates the ram 58. Thus the application of the CLEAR signal to the interlock 216 causes all of the pins 82 and stops 110 to be lowered via the air cylinders 84 and 124, the conveyor assembly 16 to be moved to the rest position via the ram 58, and the motor 31 to be deactuated.

Assuming, for example, that the bar 14 is to be cut to a length of 21 feet 7 inches, then the third feet tens switch 264 (that is the switch 264 designated "2"in FIG. 9), the second feet units switch 262 (that is the switch 262 designated "1" 38 in FIG. 9) and the eighth inches switch 260 (that is the switch 260 designated "7" in FIg. 9) should be depressed.

The composite LENGTH signal so produced is applied, as shown in FIG. 8, to the length memory 222 which continuously reproduces the LENGTH signal for application to the length decoder 212. Simultaneously, the visual display 230 produces a visual display indicative of the LENGTH signal for confirmation by the operator. More particularly, the INCHES portion produced by the inches switch 260 is applied to the eighth $h$ flip-flop 278 (FIG. 11) in the inches memory portion 272 (FIG. 10) of the length memory 222 (FIG. 8). The INCHES portion is then continuously reproduced by the flip-flop 278 for application to the eighth NOR gate 352 (FIG. 15) in the inches decoder portion 348 (FIG. 10) of the length decoder 212 (FIG. 8). Simultaneously, the INCHES portion is decoded by the decoder/driver portion 286 (FIG. 12) of the inches display portion 280 (FIG. 10) of the visual display 230 (FIG. 8) for display on the inch units display 288 and the inch tens display 290 (see FIG. 9). In a similar manner, the FEET UNITS portion and the FEET TENS portion of the LENGTH signal are applied to the respective flip-flops 278 (FIG. 11) of the feet units memory portion 274 and the feet tens memory portion 276 (FIG. 10) of the length memory 222 (FIG. 8) for continuous application to the appropriate NOR gates 354 (FIG. 16) in the feet decoder portion 350 (FIG. 10) of the length decoder 212 (FIG. 8). Further, the FEET UNITS portion and the FEET TENS portion are also applied to the feet units display portion 282 and the feet tens display portion 284 (FIG. 10) of the visual display 230 (FIG. 8) for display via the decoder/driver portions 314 (FIG. 13) and 332 (FIG. 14) and the feet units display 316 and the feet tens display 334 (see FIG. 9).

Once the length has been entered and confirmed via the displays 288, 290, 316 and 334, the operation of the length determining machine 10 can be initiated by depressing the set switch 256 (see FIG. 9). The SET signal so produced is applied, as shown in FIG. 8, to the interlock 216 to enable the operation of the length determining assembly of the length determining machine 10. More particularly, the SET signal is applied as shown in FIG. 18 to the stop control flip-flop 410, the conveyor control flip-flop 412 and the pin control flip-flop 422. In response to the SET signal, the stop control flip-flop 410 ceases to produce the first disable signal D1 thereby allowing the twenty-second NOR gate 354 (FIG. 16) of the feet decoder portion 350 (FIG. 10) to actuate the twenty-second air cylinder 124 (FIG. 10) so as to raise the twenty-one foot stop 110, that is the stop 110 located twenty-one feet away from the cutting plane of the shearing machine 12. In response to the SET signal, the conveyor control flip-flop 412 actuates the motor 31. In response to the SET signal, the pin control flip-flop 422 ceases to produce the second disable signal D2 thereby allowing the eighth NOR gate 352 (FIG. 15) of the inches decoder portion 348 (FIG. 10) to actuate the eighth air cylinder 84 so as to raise the pin 82 located seven inches away from the rest position of the strike plate 102. Further, the pin control flip-flop 422 actuates the ram 58 so that the conveyor assembly 16 is moved into striking engagement with the raised pin 82.

With the raised stop 110 now positioned 21 feet 7 inches away from the cutting plane of the shearing machine 12, the bar 14 can be fed through the shearing machine 12 onto the moving rollers 22. The combined action of the rollers 22 and the bar feeding assembly (either mechanical or manual) moves the bar 14 into abuttment with the raised stop 110. The shearing machine 12 can now be cycled to cut the bar 14 to the desired length of 21 feet 7 inches.

After the bar 14 has been cut, one of the bins 180, 182 or 184 should be selected to receive the bar 14. Assuming, for example, that the bar 14 is to be placed in the bin 182 located on the same side of the length determining machine 10 as the input panel 210 (FIG. 1), that is the bin 182 shown in the open position in FIG. 7, then the bin switch 270 controlling the air cylinder 200, which in the preferred embodiment would be the bin switch 270 designated B2 in FIG. 9, should be actuated. The BIN signal so produced will be applied directly to the air cylinder 200, as shown in FIG. 17, so as to actuate the cylinder 200 and raise the slide arms 198, thus opening the selected bin 182.

One of the station portions of the selected bin 182 should also be selected to receive the bar 14. Assume, the example, that the bar 14 is to be placed in the second station portion, that is the portion of the bin 182 located adjacent the shearing machine 12 side of the thirty-six foot stop 110. Therefore, the second station switch 266, that is the station switch 266 designated S2 in FIG. 9, should be depressed. The STATION portion of the REMOVAL signal so produced, that is the signal S2, is applied, as shown in FIG. 8, to the removal memory 232 which continuously reproduces the STATION portion for application to the removal decoder 214. More particularly, the signal S2 is applied to the flip-flop 362 (FIG. 18) of the station memory portion 356 (FIG. 17) of the removal memory 232 (FIG. 8). The signal S2 is then continuously reproduced by the flip-flop 362 for application to the OR gate 368 (FIG. 18) of the station decoder portion 360 (FIg. 17) of the removal decoder 214 (FIG. 8). The OR gate 368 actuates the thirty-seventh air cylinder 124 to raise the thirty-six foot stop 110.

Simultaneously, the STATION portion is applied to the interlock 216 (FIGS. 8 and 17). More particularly, the signal S2 is applied to the stop control flip-flop 410 (FIG. 18) of the interlock 216 (FIGS. 8 and 17) via the OR gate 414 (FIG. 18). In response, the stop control flip-flop 410 produces the first disable signal D1 for disabling the operation of the length decoder 212, as described above, thus lowering the twenty-one foot stop 110. The STATION portion is also applied via the OR gate 414 (FIG. 18) to the conveyor control flip-flop 412 (FIG. 18) of the interlock 216 (FIGS. 8 and 17) to assure that the motor 31 is actuated.

Once the thirty-six foot stop 110 has been raised via the station decoder portion 360 of the removal decoder 214, the twenty-one foot stop 110 lowered via the stop control flip-flop 410 of the interlock 216, and the motor 31 actuated via the conveyor control flip-flop 412 of the interlock 216, the bar 14 will be moved by the rollers 22 into abuttment with the thirty-six foot stop 110.

The kickoff switch 268 designated in FIG. 9 as K2, should now be depressed in order to effect the removal of the bar 14 from the conveyor assembly 16. The KICKOFF portion of the REMOVAL signal, that is the signal K2, produced by the actuation of the kickoff switch 268, is applied, as shown in FIG. 8, to the removal memory 232 which continuously reproduces the KICKOFF portion for application to the removal decoder 214. More particularly, the signal K2 is applied to the flip-flop 374 (FIG. 18) of the kickoff memory portion 358 (FIG. 17) of the removal memory 232 (FIG. 8). The signal K2 is then continuously reproduced as the inverted signal $\overline{K2}$ by the flip-flop 374 for application to the NOR gate 378 (FIG. 18) of the kickoff decoder portion 362 (FIG. 17) of the removal decoder 214 (FIG. 8).

The signal K2 is also applied, via the OR gate 382 (FIG. 18), to the kickoff timer 386 (FIG. 9) of the kickoff decoder portion 362 (FIG. 18) thereby closing the switch 390 to produce a "low" signal from the NOR gate 388 (FIG. 18). The "low" signal from the NOR gate 388 and the signal $\overline{K2}$ cooperate via the NOR gate 378 to actuate the air cylinders 161 so as to raise the lift arms 144 to the position shown in FIGS. 2 and 7. The predetermined time delay of the kickoff timer 386 should be adjusted at the input panel 210 (see FIGS. 1 and 9) so that the lift arms 144 are maintained in the raised position sufficiently long to effect the movement of the bar 14 from the lift arms 144 to the adjacent slide arms 194.

Simultaneusly, the KICKOFF portion is also applied via the OR gate 382 to the interlock 216 as shown in FIG. 18. More particularly, the KICKOFF portion is applied to the conveyor control flip-flop 412 thereby deactuating the motor 31.

After the predetermined time delay set at the input panel 210, the kickoff timer 386 opens the switch 390 thereby producing a "high" signal via the NOR gate 388 to deactuate the air cylinders 161, via the NOR gate 378, and lower the lift arms 144. The "high" signal produced by the NOR gate 388 is also applied to the NOR gate 402 via the NOT gate 400 and the time delay 406 so as to produce the RESET signal, the duration of which is determined by the time delay 406.

The RESET signal is applied to the station memory portion 356 and the kickoff memory portion 358 (FIG. 17) of the removal memory 232 (FIG. 8) and, in particular, to the flip-flops 362 and 374, thereby clearing the flip-flops 362 and 374. The clearing of the flip-flop 374 has no visible effect since the lift arms 144 have already been lowered via the operation of the kickoff timer 386 and the NOR gates 388 and 378. However, the clearing of the flip-flop 362 causes the OR gate 368 (FIG. 18) to deactuate the thirty-seventh air cylinder 124 thus lowering the thirty-sic foot stop 110.

The RESET signal is also applied to the stop control flip-flop 410 (FIG. 18) of the interlock 216 (FIGS. 8 and 17) thereby causing the stop control flip-flop 410 to cease producing the first disable signal D1. Since the first disable signal D1 is no longer being produced, the twenty-second NOR gate 354 (FIG. 16) of the feet decoder portion 350 (FIG. 17) of the length decoder 212 (FIG. 8) once again actuates the twenty-second air cylinder 124 so as to raise the twenty-one foot stop 110.

The length determining machine 10 is now in a position to begin another bar cutting operation as described above. This time, however, only the set switch 256 on the input panel 210 should be depressed in order to actuate the motor 31 via the conveyor control flip-flop 412 (FIG. 18) of the interlock 216 (FIGS. 8 and 17). It is clear that the length memory 222 and length decoder 212 are still operating under the inputs previously entered thus making reentry of the length data unnecessary. Similarly, the bin selection remains unchanged since the bin switches 270 are of the persistent type and will change only when manually reset. Thus, the above described lenght determining and removal operations can be repeated indefinitely merely by feeding additional bars 14 through the shearing machine 12 onto the moving rollers 22, cycling the shearing machine 12, then depressing the appropriate station and kickoff switches 266 and 268, respectively, and the set switch 256.

When the length setting is to be changed, the clear switch 258 (see FIG. 9) should be depressed and the sequence of actions described above repeated using the new setting. It is clear however, that a different bin or station may be selected at any time without having to reenter the length data, merely by changing the bin switches 270 or by depressing a different one of the station or kickoff switches 266 or 268, respectively, at the appropriate point in the above described sequence.

As will be clear to those skilled in the art, the present invention provides a simple and economical way for controlling the operation of a length determining machine. The present invention greatly increases the efficiency of an operator while assuring the safe operation of the length determining machine. While numerous modifications and improvements will readily occur to those skilled in the art, it is to be understood that changes may be made in the construction and the arrangements of the parts or the elements of the embodiments disclosed herein without departing from the spirit and scope of the invention as defined in the following claims.

What is claimed is:

1. A control apparatus for controlling the operation of a length determining machine having a length determining assembly comprised of an inches portion and a feet portion, and a removal assembly comprised of a station portion and a kickoff portion, the control apparatus comprising:
    input means for producing a length signal comprised of an inches portion and a feet portion, and a removal signal comprised of a station portion and a kickoff portion;
    length decoder means for receiving the length signal and actuating the length determining assembly of the length determining machine in response to the received length signal, the length decoder means comprising:
        inches decoder means for receiving the inches portion of the length signal and actuating the inches portion of the length determining assembly of the length determining machine in response to the received inches portion of the length signal; and,
        feet decoder means for receiving the feet portion of the length signal and actuating the feet portion of the length determining assembly of the length determining machine in response to the received feet portion of the length signal; and,
    removal decoder means for receiving the removal signal and actuating the removal assembly of the length determining machine in response to the received signal, the removal decoder means comprising:
        station decoder means for receiving the station portion of the removal signal and actuating the station portion of the removal assembly of the length determining machine; and,
        kickoff decoder means for receiving the kickoff portion of the removal signal and actuating the kickoff portion of the removal assembly of the length determining machine.

2. The apparatus of claim 1 further characterized as comprising length memory means interposed between the input means and the length decoder means for receiving the length signal and continuously reproducing the received length signal for application to the length decoder means.

3. The apparatus of claim 1 further characterizied as comprising visual display means for receiving the length signal and producing a visual display indicative of the received length signal.

4. The apparatus of claim 1 further defined to include interlock means receiving the removal signal and preventing the operation of the length decoder means in response to the received removal signal.

5. The apparatus of claim 1 further characterized as comprising:
length memory means interposed between the input means and the length decoder means, comprising:
inches memory means for receiving the inches portion of the length signal and continuously reproducing the received inches portion of the length signal for application to the inches decoder means; and,
feet memory means receiving the feet portion of the length signal and continuously reproducing the received feet portion of the length signal for application to the feet decoder means.

6. The apparatus of claim 1 further characterized as comprising:
visual display means comprising:
inches display means for receiving the inches portion of the length signal and producing a visual display indicative of the received inches portion of the length portion; and,
feet display means for receiving the feet portion of the length signal and producing a visual display indicative of the received feet portion of the length signal.

7. The apparatus of claim 1 wherein the removal decoder means is further characterized as comprising:
timing means for receiving the kickoff portion of the removal signal and producing a reset signal terminating the operation of the kickoff decoder means a predetermined time period after receiving the kickoff portion of the removal signal.

8. The apparatus of claim 7 further characterized as comprising:
removal memory means interposed between the input means and the removal decoder means, comprising:
station memory means for receiving the station portion of the removal signal and continuously reproducing the received station portion of the removal signal for application to the station decoder means; and,
kickoff memory means for receiving the kickoff portion of the removal signal and continuously reproducing the received kickoff portion of the removal signal for application to the kickoff decoder means.

9. The apparatus of claim 7 which is further characterized as comprising:
interlock means comprising:
stop control means for receiving the station portion of the removal signal and the reset signal, disabling the operation of the feet decoder means in response to the received station portion of the removal signal, and enabling the operation of the feet decoder means in response to the received reset signal; and,
conveyor control means for receiving the kickoff portion of the removal signal and the station portion of the removal signal, deactuating the power conveyor assembly of the length determining machine in response to the received kickoff portion of the removal signal, and actuating the power conveyor assembly of the length determining machine in response to the received station portion of the removal signal.

10. The apparatus of claim 9 wherein the input means is further characterized as producing a set signal and a clear signal, and the interlock means is further characterized as comprising:
pin control means for receiving the set signal and the clear signal, enabling the operation of the inches decoder means in response to the received set signal, and disabling the operation of the inches decoder means in response to the received clear signal.

11. The apparatus of claim 10 wherein the stop control means is further characterized as receiving the set signal and the clear signal, disabling the operation of the feet decoder means in response to the received clear signal, and enabling the operation of the feet decoder means in response to the received set signal.

12. The apparatus of claim 10 wherein the conveyor control means is further characterized as receiving the set signal and the clear signal, disabling the operation of the power conveyor assembly of the length determining machine in response to the received clear signal, and enabling the operation of the power conveyor assembly of the length determining machine in response to the received set signal.

* * * * *

UNITED STATES PATENT OFFICE
CERTIFICATE OF CORRECTION

Patent No. 4,016,072     Dated April 5, 1977

Inventor(s) Clarence William Cavenar

It is certified that error appears in the above-identified patent and that said Letters Patent are hereby corrected as shown below:

Column 1, line 47, "of" should be --for--.

Column 2, lines 34 and 36, "-" should be --/--.

Column 8, line 19, "decode" should be --decoder--.

Column 8, line 42, the word "clear" should be capitalized.

Column 8, line 46, "reset" should be --rest--.

Column 10, line 19, "M" should be --$\overline{M}$--.

Column 10, line 30, "appropriate" should be --appropriately--.

Column 10, line 35, "reprpoduces" should be --reproduces--.

Column 12, line 8, "g" should be --9--.

Column 12, line 9, after the word "3" should be inserted the words --or 7--.

UNITED STATES PATENT OFFICE
CERTIFICATE OF CORRECTION

Patent No. 4,016,072          Dated April 5, 1977

Inventor(s) Clarence William Cavenar

It is certified that error appears in the above-identified patent and that said Letters Patent are hereby corrected as shown below:

Column 18, line 49, "bisable" should be --disable--.

Column 18, line 62, "138" should be --1--.

Column 21, line 41, "thirty-sic" should be --thirty-six--.

Column 21, line 64, "lenght" should be --length--.

Column 23, line 31, "portion" should be --signal--.

Signed and Sealed this nineteenth Day of July 1977

[SEAL]

Attest:

RUTH C. MASON
Attesting Officer

C. MARSHALL DANN
Commissioner of Patents and Trademarks